(12) United States Patent
Stecher

(10) Patent No.: US 9,949,491 B2
(45) Date of Patent: Apr. 24, 2018

(54) BAKING TRAY

(71) Applicant: ACS Coating Systems GmbH, Wilhelmshaven (DE)

(72) Inventor: Christoph Stecher, Wilhelmshaven (DE)

(73) Assignee: ACS Coating Systems GmbH, Wilhelmshaven (DE)

( * ) Notice: Subject to any disclaimer, the term of this patent is extended or adjusted under 35 U.S.C. 154(b) by 0 days.

(21) Appl. No.: 14/417,705

(22) PCT Filed: Jul. 29, 2013

(86) PCT No.: PCT/DE2013/000430
§ 371 (c)(1),
(2) Date: May 26, 2015

(87) PCT Pub. No.: WO2014/015850
PCT Pub. Date: Jan. 30, 2014

(65) Prior Publication Data
US 2015/0296806 A1 Oct. 22, 2015

(30) Foreign Application Priority Data

Jul. 27, 2012 (DE) .................. 10 2012 014 923
Apr. 12, 2013 (DE) .................. 10 2013 006 314

(51) Int. Cl.
*B65D 1/42* (2006.01)
*A21B 3/15* (2006.01)
(Continued)

(52) U.S. Cl.
CPC .................. *A21B 3/15* (2013.01); *B65D 7/44* (2013.01); *F24C 15/14* (2013.01); *F24C 15/16* (2013.01)

(58) Field of Classification Search
CPC . A21B 3/15; B65D 7/44; B65D 85/36; B65D 2581/3405; B65D 2581/34; B65D 2581/3401; B65D 2581/3402
USPC ............ 220/640, 641, 646, 669, 571, 573.1, 220/573.2, 574, 574.2; 206/557, 558, 206/559, 560, 561, 562, 563, 564, 555
See application file for complete search history.

(56) References Cited

U.S. PATENT DOCUMENTS

| 1,567,234 A | * | 12/1925 | Brucker | .................. | A21B 3/13 206/804 |
| 2,287,309 A | | 6/1942 | Howard | | |

(Continued)

FOREIGN PATENT DOCUMENTS

| DE | 9217899 U1 | 6/1993 |
| DE | 29905157 U1 | 6/1999 |
| EP | 2051014 A2 | 4/2009 |

OTHER PUBLICATIONS

PCT Search Report and Written Opinion dated Dec. 17, 2013, in International Patent Application No. PCT/DE2013/000430, accompanied by an English-language translation, 16 pages.

*Primary Examiner* — Kareen Thomas
(74) *Attorney, Agent, or Firm* — Ganz Pollard, LLC

(57) ABSTRACT

Baking tray having a supporting area and a rim surrounding said supporting area on all sides, which in relation to a top face of the supporting area has a downward extending trough-shaped profile, comprising a first, downward extending trough wall, directly adjoining the supporting area, a trough base and a second, upward extending trough wall opposite the first trough wall.

18 Claims, 4 Drawing Sheets

Figure 10A:
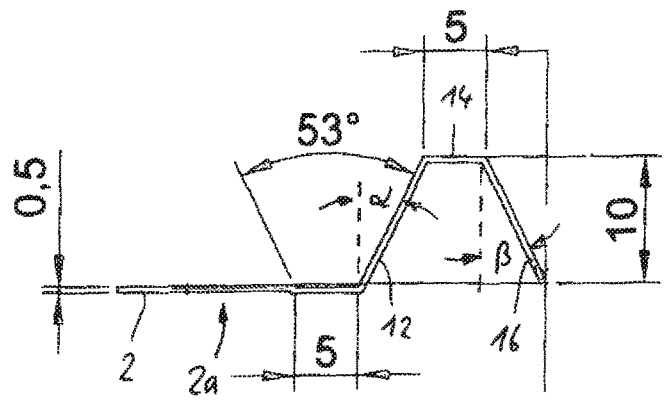
Figure 10B:
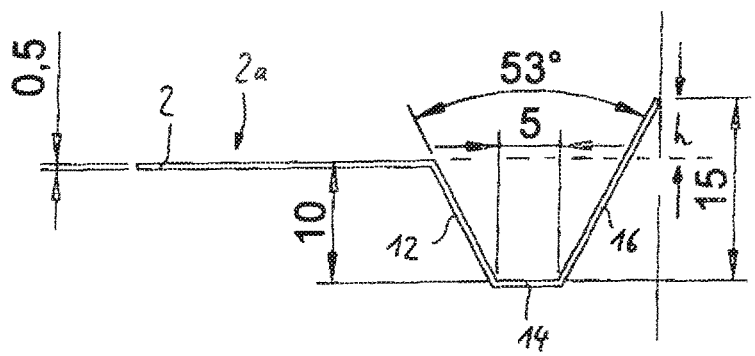

(51) Int. Cl.
*F24C 15/14* (2006.01)
*F24C 15/16* (2006.01)
*B65D 6/34* (2006.01)

(56) References Cited

U.S. PATENT DOCUMENTS

| | | | | |
|---|---|---|---|---|
| 3,863,833 A * | 2/1975 | Swett | ............ | A47J 47/02 |
| | | | | 206/557 |
| 4,765,463 A * | 8/1988 | Chanel | ............ | B29C 66/723 |
| | | | | 206/213.1 |
| 5,347,978 A * | 9/1994 | Zuran | ............ | A47J 37/067 |
| | | | | 126/25 R |
| 5,453,574 A | 9/1995 | Zuran | | |
| 5,984,130 A * | 11/1999 | Hayes | ............ | B65D 1/34 |
| | | | | 206/508 |
| 6,065,629 A * | 5/2000 | Sarnoff | ............ | B65D 45/02 |
| | | | | 220/315 |
| D461,101 S * | 8/2002 | Garbo | ............ | D7/545 |
| 2007/0178197 A1* | 8/2007 | LaRue | ............ | B65D 81/265 |
| | | | | 426/129 |
| 2010/0258471 A1* | 10/2010 | Enriquez | ............ | B65D 1/34 |
| | | | | 206/557 |
| 2012/0152797 A1* | 6/2012 | Gross | ............ | B65D 81/261 |
| | | | | 206/557 |

* cited by examiner

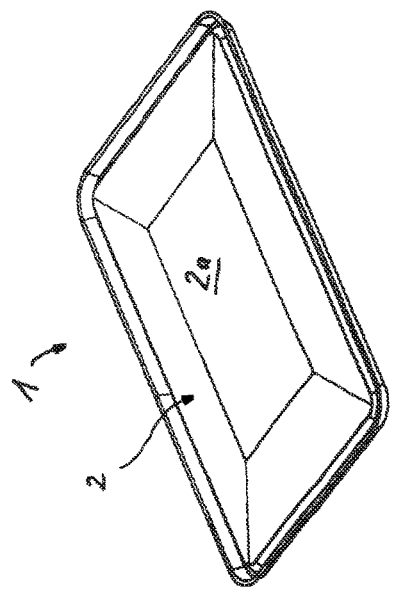
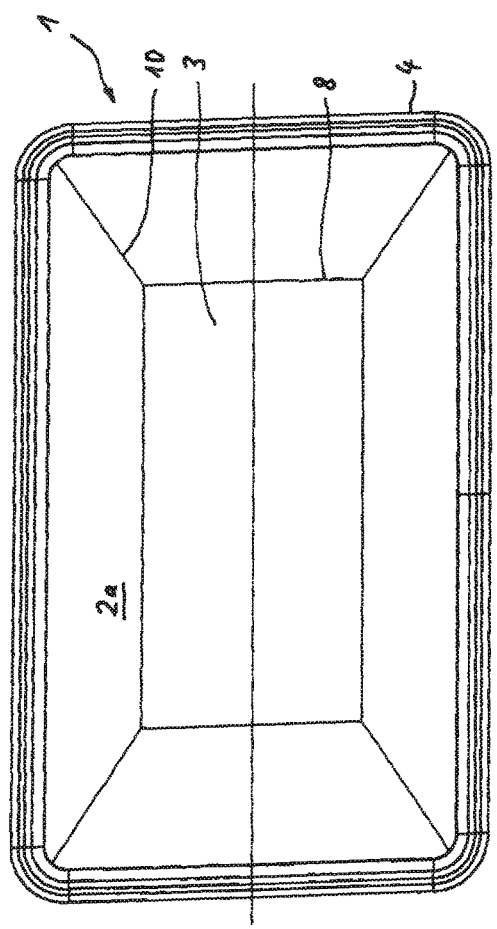
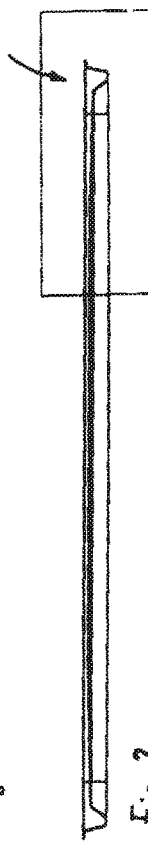
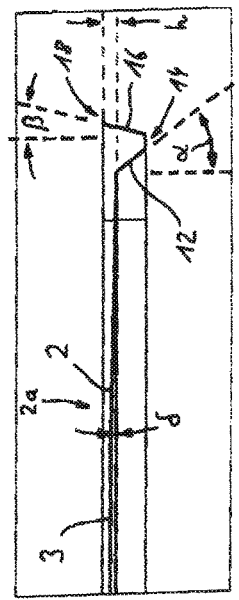

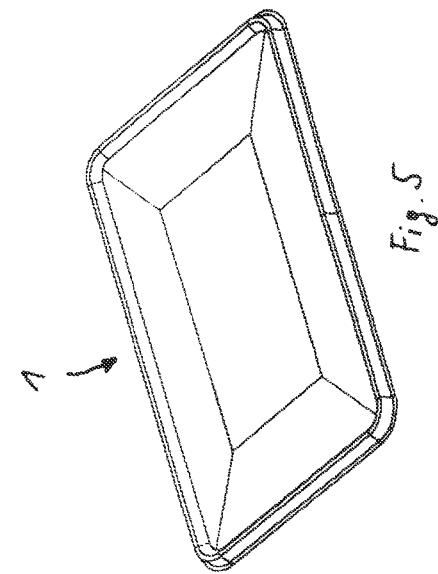
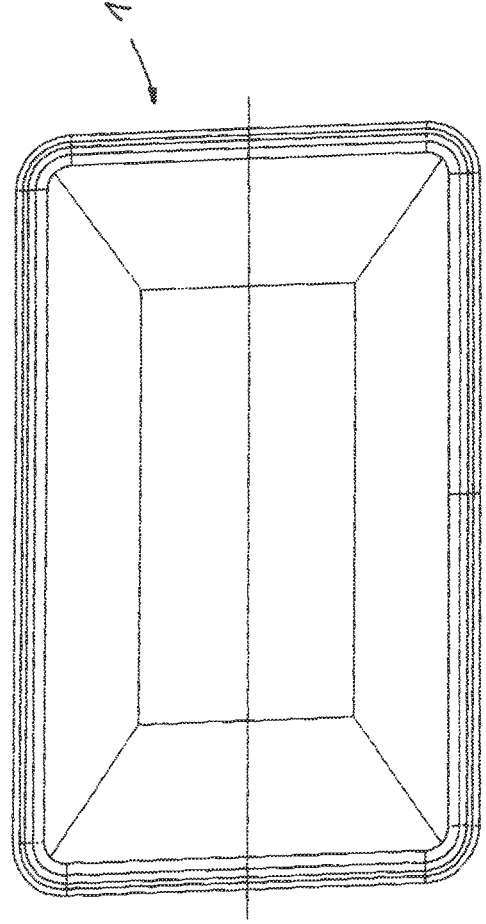
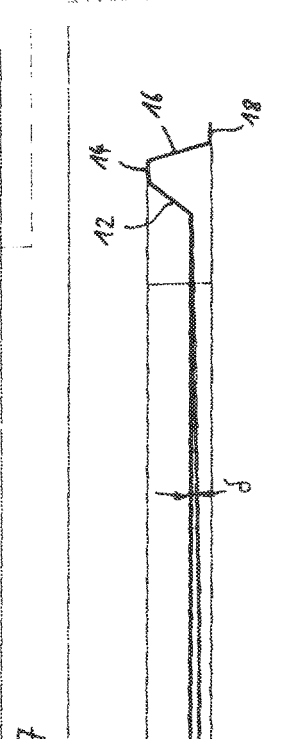

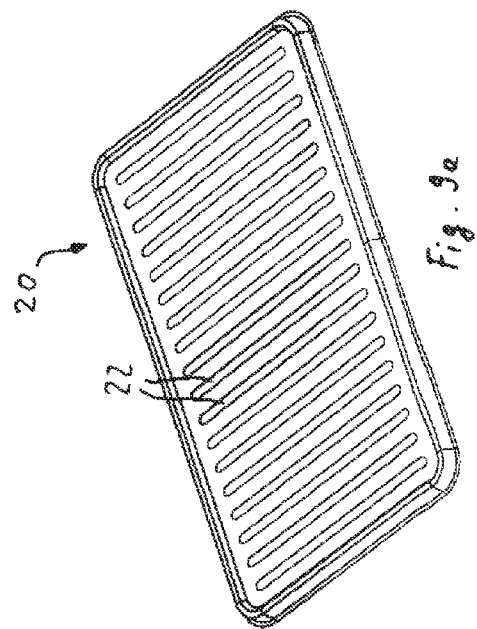
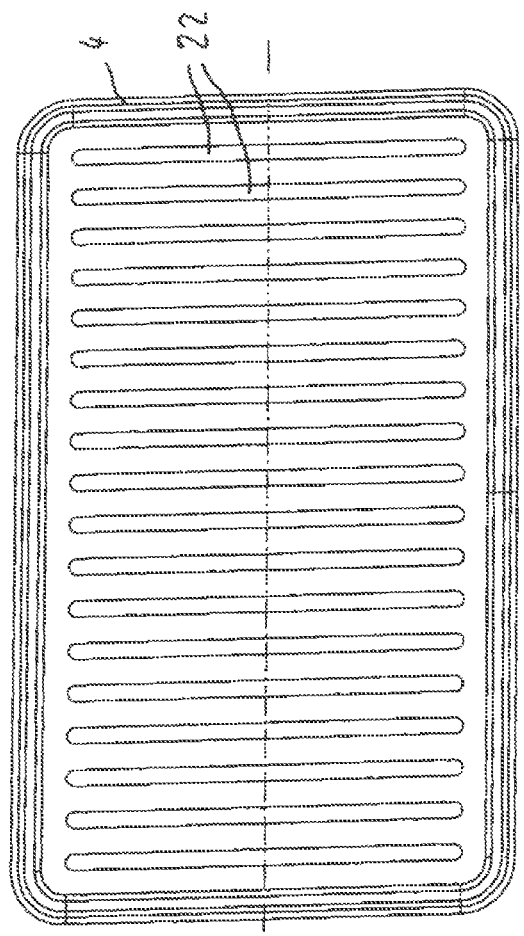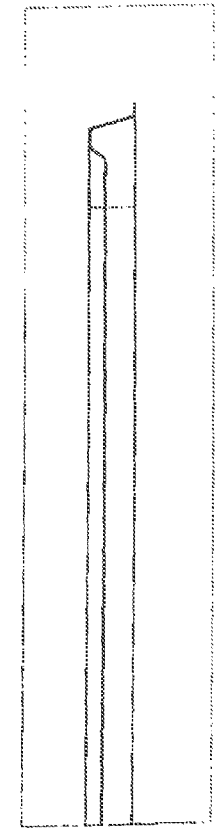

BAKING TRAY

The invention relates to a baking tray having a supporting area and a rim surrounding said supporting area on all sides.

For baking procedures in ovens various containers are presently known. Enamelled steel sheet in the form of receptacles and containers has the disadvantage that the coating easily chips off and there is no good non-stick effect. Conventional baking trays made from aluminum, generally with canted and flanged sides, bare or coated for example with Teflon, have the disadvantage that they flex substantially in use and do not stand firmly on a flat surface. Although roasting pans and dishes made from cast aluminum, also with partly grooved surface or with open structures as grill rack, are stable and can be used on both sides in some cases with different functions, they are at times disadvantageous due to the relatively heavy weight and the costs associated therewith.

In the case of baking trays high temperature resistance, preferably up to at least 300° C., is a basic requirement, it being necessary that no significant deformation occurs even at high temperatures under load.

The object of the invention is to meet the requirements for light weight, minimum deformation even at high temperatures and little tendency to stick in the case of a roasting or baking tray or a grill rack.

This object in the case of a generic baking tray is achieved by designing the rim so that it has a downward extending trough-shaped profile in relation to a top face of the supporting area with a first, downward extending trough wall directly adjoining the supporting area, a trough base and a second, upward extending trough wall opposite the first trough wall.

The baking tray is made from a metallic material, for instance steel or light alloy (aluminium or aluminium alloy). A multi-layer or sandwich structure of several different metallic materials is also possible, for example a combination of steel and copper, steel and aluminum or aluminum and copper.

Expediently the baking tray is fabricated as a thin temperature-resistant metal sheet, for instance from stainless steel, chrome-plated steel or from ferritic steel with nickel chrome or aluminium plating, or from aluminum or an aluminium alloy.

In order not to substantially exceed the weight of aluminuim baking trays approx. 1.5 to 2.5 mm in thickness, particularly a thickness ranging from approx. 0.5 mm to 0.8 mm is possible in the case of steel sheet. Compared with aluminum castings the metal thicknesses can be increased to 2 mm without incurring a weight penalty. In the case of not closed trays even greater metal thicknesses are also possible without weight penalty. Although the embodiment can be even thicker, for example up to 5 mm or more, lesser thicknesses are preferred from a cost and weight aspect. In the case of aluminium or multi-layer materials a thickness of approx. 1.5 and 3 mm may be sensible.

Expediently the invention proposes that the second trough wall extends at least up to the height of the supporting area, it being possible that it terminates at a predetermined height above the supporting area. There is the possibility that the second trough wall changes into a bent rim portion, which can extend in parallel with the supporting area.

There is also the possibility that the second trough wall or the rim portion is provided with end beading.

Thin trays, which in themselves are advantageous with respect to cost and weight, do not possess sufficient flexural rigidity. Therefore the rigidity is increased by folding the sides, sharp rims being more effective than rounder rims. In addition it is surprising that the flexural rigidity of the base or supporting area is not symmetrical in both directions, but depending on the folding direction of the trough walls a memory of the deformation process seems to be retained. Therefore it is advantageous when the trough walls are bent or folded in the opposite direction as in the case of known baking trays, that is to say initially downward and not upward.

Thus the baking tray acquires a shape which comprises a circumferential trough-shaped drainage channel, which in the preferred embodiment is upwardly open in relation to the top face of the supporting area. This offers greater flexural rigidity in relation to the prior-art geometry of the rim. By an additional hollow curvature of the supporting area, possibly in conjunction with reinforcement rims, —beads or— semi-beads, flexural rigidity is increased once again.

The trough-shaped profile of the rim can taper off at the corners or continue enclosed, it being possible that the corners are then rounded, resulting in particularly good rigidity.

It is especially advantageous if the profiled rim or the drainage channel forms both the deepest and the highest part of the baking tray, so that the baking tray with the functional surfaces (top face and bottom face of the supporting area) cannot contact when placed on a flat surface, so that a firm stand always ensues.

Expediently the supporting area can have an upwardly convex, bent or zonally flat shape, in relation to its top face, which with roasting pans is referred to as collecting channel. In the case of this shape, liquid which possibly escapes from the baked product lying on the supporting area runs into the drainage channel and/or into the trough-shaped profile and can be collected there so that the actual grilling or baking surface remains dry.

The shape of the trough-shaped profile is selected so that the baking tray fits into normal shelves or guide rails of baking-ovens.

It is advantageous if the first trough wall is bent or folded at a predetermined angle in relation to the supporting area, particularly folded to form a sharp rim.

It is also advantageous if the second trough wall is bent or folded at a predetermined angle in relation to the first trough wall, in particular folded to form a sharp rim. A flat trough base, which can be folded in relation to the trough walls and preferably folded to form a sharp rim, can be arranged between both trough walls.

The first and the second trough wall can be folded in relation to the trough base at the same angle. In particular the trough base can be horizontal.

The rim is preferably formed so that the baking tray is stackable.

There is also the additional possibility of implementing a second tray adapted as grill rack by breaking up the supporting area with recesses, it being possible that the supporting area serving as grill surface is formed corrugated. Escaping liquid can then be collected in/on a baking tray arranged therebelow. An advantage over known shapes in the case of this embodiment is that the baking tray and the grill rack form a securely joined unit and fit into a shelf of an oven, so that efficiency is increased.

The baking tray can also be used up-side-down, so that it stands firmly on a flat surface even in this position due to the trough-shaped rim profile. In this position the supporting area, in a preferred embodiment viewed from above, is not convex but concave, resulting in the possibility of preparing meals which should not rest dry, but for example should swim or lie in liquid. This is also the case with conventional receptacles in box-format, it being possible however that in contrast to such receptacles the supporting area in the case of a baking tray according to the invention is concave, which if the rim was not designed in accordance with the invention would impair the stability of a conventional receptacle.

Advantageously the aforementioned grill rack can be placed on top of a baking tray in "up-side-down" position, because the absorption capacity of liquid in the baking tray is that much greater and can improve the function.

An advantageous refinement of the baking tray as grill rack therefore is that the supporting area as grill surface is provided with recesses and is possibly corrugated. One aspect of the invention lies in a combination of a baking tray with a grill rack, each according to the invention.

Expediently the baking tray is provided with a non-stick coating, it being possible that corrosion protection is of advantage if low-cost steel is used, e.g. aluminised carbon steel or chrome-plated steel.

Particularly suitable are coatings with sufficient temperature resistance as for example produced from high-performance synthetic materials such as PEK, PEEK and PEKEKK (in each case polyaryletherketone and/or PAEK, PEKK etc., temperature-resistant polymers, resins and thermoplastics, also fluoropolymers). So-called nano-coatings on a silicate basis, which are temperature-resistant up to 450° C., are also suitable. Furthermore, ceramic coatings and coatings based on temperature-resistant resins, e.g. silicone resin, are suitable. If stainless steel is used, a coating can be dispensed with.

The baking tray can be coated on both sides, it being possible depending on the particular embodiment that the film thickness ranges between 1 µm and 100 µm.

The invention is described below on the basis of various exemplary embodiments with reference to a drawing, wherein FIG. 1 shows a perspective view onto a baking tray according to the invention from above, FIG. 2 shows a plan view onto the baking tray according to FIG. 1 from above, FIG. 3 shows a cutaway view along lines III-III in FIG. 2, FIG. 4 shows an enlarged cutaway illustration from FIG. 3, FIG. 5 shows a perspective view of the baking tray according to FIGS. 1-4 from below, FIG. 6 shows a plan view onto the baking tray from below, FIG. 7 shows a cutaway view along lines VII-VII in FIG. 6, FIG. 8 shows an enlarged cutaway illustration from FIG. 7, FIGS. 9a-d show corresponding views as FIGS. 5-8 of a grill rack, and FIGS. 10a-d show different rim profile variants of a baking tray with exemplary dimensions.

FIGS. 1-8 show an embodiment of an inventive baking tray 1, and to be precise from above (FIGS. 1-4) and below (FIGS. 5-8). The substantially rectangular baking tray has a supporting area 2 and a rim 4 surrounding said supporting area on all sides, which is formed in a straight line along the four sides of the baking tray and rounded off quadrant-shaped in the corners. The rim 4 has a downward extending trough-shaped profile 6 in relation to a top face 2a of the supporting area 2.

The substantially rectangular supporting area 2 is strengthened against unwanted flexing by a total of four rectangular reinforcement beads or semi-beads 8 as well as by four further reinforcement beads or—semi-beads 10 extending diagonally into the corners of the baking tray.

The trough-shaped profile 6 has a first, downward extending trough wall 12 in relation to the top face 2a, directly adjoining the supporting area 2, a trough base 14 and a second, upward extending trough wall 16 opposite the first trough wall 12. The second trough wall 16 extends up to a height h above the supporting area 2 in its rim region, and terminates in an outwardly bent rim portion 18, which extends substantially horizontally or in a plane parallel to the supporting area 2.

The first trough wall 12 stands at an angle α of approx. 40° to the vertical, whereby this angle should amount to at least 10°. The second trough wall 16 stands at an angle β of approx. 20° to the vertical, whereby this angle should also amount to at least 10°. The trough base 14 in the example illustrated is flat and extends horizontally.

Although the supporting area 2 could extend in a horizontal plane, it is preferably formed slightly upwardly convex in relation to the top face 2a, so that liquids, which when the baking tray is in use possibly form on the top face 2a of the supporting area 2, into which the trough-shaped profile 6 can extend. The angle δ, by which the supporting area 2 increases starting from the rim region in relation to a horizontal plane, amounts to circa 1.3° and can range between 0 and approximately 3°. Due to its convexity the supporting area 2 is located in a rectangular, flat, central area 3 bordered by the four reinforcement beads 8 a few millimeters above the rim region, approx. 2 mm higher in the exemplary embodiment illustrated.

Despite the convexity of the supporting area 2 the rim portion 18 is still located above the highest, central part of the supporting area 2, approx. 2.5 mm higher in the exemplary embodiment illustrated. With the trough-shaped profile shown it is ensured that the baking tray both in the orientation of FIGS. 1, 3 and 4, in which the top face 2a points upward, and as also in up-side-down orientation, in which the top face 2a points downward (FIGS. 5, 7 and 8), stands firmly when placed on a flat surface since it rests either on the trough-shaped profile (and/or the trough base 14) or the rim portion 18. In this case the supporting area 2 is always remote from the flat surface and is protected against wear or contamination.

FIGS. 9a-d show a grill rack in views, which correspond to the views according to FIGS. 5-8, with the difference that the grill rack 20 does not have a closed supporting area 2 as the baking tray but is provided with recesses, which are formed here as oblong slots 22, so that a grill-type surface ensues. The grill rack 20 just as the baking tray illustrated in FIGS. 1-8 can be stacked both on other grill racks and on a baking tray, so that it can be used particularly in combination with a baking tray, the grill rack being placed from above onto a baking tray in up-side-down orientation (FIG. 5) either with its top face pointing downward (orientation shown in FIG. 9a), or vice versa in which a grill rack with top face pointing upward is placed on a baking tray in the orientation of FIG. 1 (top face pointing upward) (compared to FIG. 9a rotated by 180°).

The supporting area of the grill rack 20 is preferably flat, as shown in FIGS. 9c, d, but can be corrugated, in contrast to the overall convex shape of a baking tray (FIG. 2, 3).

Figure 10C:
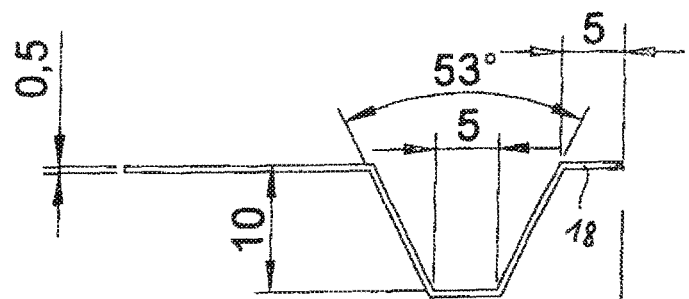
Figure 10D:
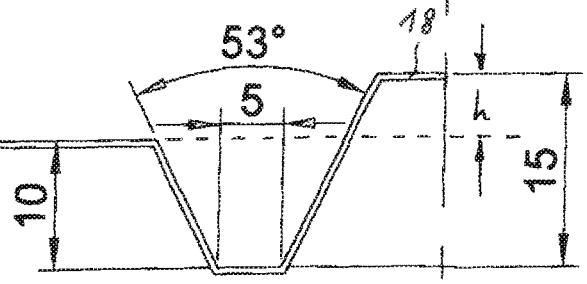

FIGS. 10a-d describe different variants of the trough-shaped profile 6 with exemplary dimensions. In a simplest embodiment according to FIG. 10a the second trough wall 16 terminates at the height of the supporting area 2. In a preferred variant according to FIG. 10b the second trough wall 16 extends to a height h above the supporting area 2 in its rim region. In both cases folded rim portions 18 are possible as with the embodiment according to FIGS. 1-8 (FIGS. 10*c*, 10*d*). Moreover there is the possibility in all embodiments and variants to provide the second trough wall 16 or, insofar as present, the rim portion 18 with a beading, in order to make the baking tray easier to grip and/or handle.

REFERENCE SYMBOL LIST

1 Baking tray
2 Supporting area
2*a* Top face
3 Central area of 2
4 Rim
6 Profile
8, 10 Reinforcement bead (reinforcement semi-bead)
12 First trough wall
14 Trough base
16 Second trough wall
18 Rim portion
20 Grill rack
22 Slot (recess)
h Height of 16 above 2
α Angle of 12 to vertical
β Angle of 16 to vertical
δ Angle of 2 to horizontal

The invention claimed is:

1. A baking tray having a supporting area and a rim surrounding said supporting area on all sides, wherein the rim has a downwardly extending, trough-shaped profile, comprising a first, downwardly extending trough wall directly adjoining the supporting area, a trough base and a second upward upwardly extending trough wall positioned opposite the first trough wall relative to the trough base, wherein the supporting area is vertically positioned above the trough base and below the rim, and the supporting area is convex upward and concave downward, relative to a top face of the supporting area, so that when preparing a baked product with liquid in the baking tray, the supporting area can direct the liquid towards the trough-shaped profile when the supporting area is positioned convex upward, and maintain the liquid within a central region of the supporting area when the supporting area is positioned concave downward, wherein an angle between a horizontal plane and a line tangent to the supporting area at a position adjacent the rim measures less than 3°.

2. A baking tray according to claim 1, wherein the second trough wall extends at least up to a height of the supporting area.

3. A baking tray according to claim 1, wherein the second trough wall terminates at a predetermined height (h) above the supporting area.

4. A baking tray according to claim 1, wherein the second trough wall is contiguous with a bent rim portion.

5. A baking tray according to claim 4, wherein the second trough wall and/or the bent rim portion are provided with end beading.

6. A baking tray according to claim 1, wherein the first trough wall is folded at a predetermined angle in relation to the supporting area.

7. A baking tray according to claim 1, wherein the second trough wall is oriented at a predetermined angle in relation to the trough base.

8. A baking tray according to claim 1, wherein the trough base has a flat portion parallel to the supporting area.

9. A baking tray according to claim 1, wherein the rim is profiled so that the baking tray is stackable with a similarly configured baking tray.

10. A baking tray according to claim 1, wherein the supporting area is provided as a grill surface with recesses.

11. A baking tray according to claim 6, wherein the predetermined angle defines a sharp rim between the first trough wall and the supporting area.

12. A baking tray according to claim 6, wherein the first trough wall stands laterally outward of the supporting area such that the predetermined angle measures at least 10° relative to a vertical axis.

13. A baking tray according to claim 12, wherein the predetermined angle measures approximately 40° relative to the vertical axis.

14. A baking tray according to claim 7, wherein the predetermined angle is selected such that the second trough wall stands laterally outward of the trough base at an angle that measures at least 10° relative to a vertical axis.

15. A baking tray according to claim 14, wherein the outward angle measures approximately 20° relative to the vertical axis.

16. A baking tray according to claim 1, wherein the supporting area has a rectangular, flat, central area bordered by four reinforcement beads or semi-beads, and four additional reinforcement beads or semi-beads extending diagonally from four corners of the central area into four corners of the baking tray.

17. A baking tray according to claim 1, wherein the angle measures about 1.3°.

18. A baking tray having a supporting area and a rim surrounding said supporting area on all sides, wherein the supporting area has a top face and a bottom face, and the supporting area is convex upward and concave downward in relation to the top face, the rim has a downwardly extending, trough-shaped profile, comprising a first, downwardly extending trough wall directly adjoining the supporting area, a trough base parallel to the supporting area, and a second upwardly extending trough wall positioned opposite the first trough wall relative to the trough base, wherein the trough base is positioned below the bottom face, the first trough wall is folded at a first predetermined angle in relation to the supporting area, the second trough wall extends upwardly at least to a height of the top face and has a second predetermined angle in relation to the trough base, the trough-shaped profile is defined by a sharp rim between the first trough wall and the supporting area, a sharp rim between the first trough wall and the trough base, and a sharp rim between the trough base and the second trough wall, wherein an angle between a horizontal plane and a line tangent to the supporting area at a position adjacent the rim measures less than 3°.

* * * * *